No. 775,459. PATENTED NOV. 22, 1904.
J. RIDDELL.
BORING BAR.
APPLICATION FILED JAN. 27, 1902.
NO MODEL.

Witnesses.

Inventor.
John Riddell.
by Albert G. Davis
Atty.

No. 775,459. Patented November 22, 1904.

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

BORING-BAR.

SPECIFICATION forming part of Letters Patent No. 775,459, dated November 22, 1904.

Application filed January 27, 1902. Serial No. 91,318. (No model.)

*To all whom it may concern:*

Be it known that I, JOHN RIDDELL, a citizen of the United States, residing at Schenectady, county of Schenectady, and State of New York, have invented certain new and useful Improvements in Boring-Bars, of which the following is a specification.

The present invention relates to boring-bars, and has for its object to improve their construction.

The scope of my invention will be more fully set forth and claimed hereinafter.

Figure 1:
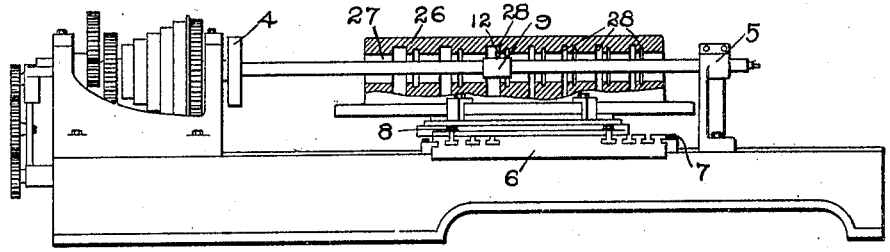
Figure 2:
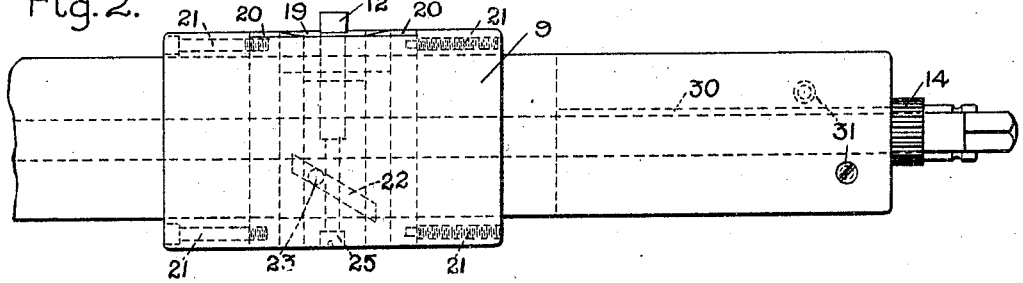
Figure 3:
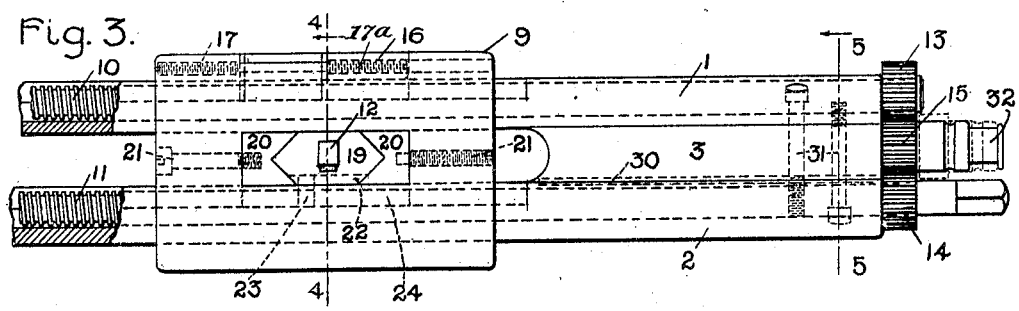
Figures 4, 5, 6:
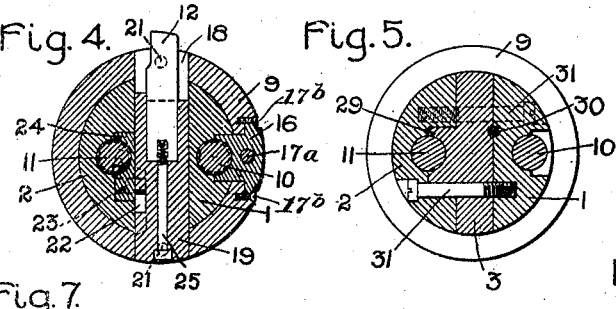
Figure 7:
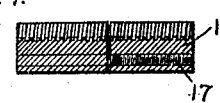
Figure 9:
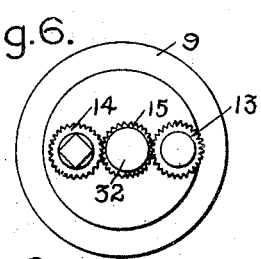
Figure 8:
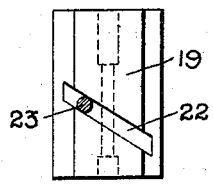

In the accompanying drawings, which represent an embodiment of my invention, Figure 1 is a front elevation of a lathe with the boring-bar in place. Fig. 2 is a side elevation of a portion of the bar, on an enlarged scale. Fig. 3 is a plan view of a portion of the bar, also on an enlarged scale. Fig. 4 is a cross-section taken on line 4 4 looking in the direction of the arrow. Fig. 5 is a cross-section of the bar, taken on line 5 5 and looking in the direction of the arrow. Fig. 6 is an end view showing the gearing for feeding the tool. Fig. 7 is a plan view of one of the nuts which engage with a feed-screw for moving the head. Fig. 8 is a side elevation of the tool-holder, showing the cam-groove for feeding or moving the tool; and Fig. 9 is a front elevation of the nut which carries the pin for moving the tool-holder.

The bar is composed of two parts 1 and 2 on account of reduced cost, which parts are united at the ends in any suitable manner. The outside of the bar is cylindrical and is turned true to form a guide for the sliding head which carries the cutting-tool. If desired, the bar can be made of solid stock and then slotted and bored to receive the various parts. In Fig. 5 is shown the arrangement of pieces forming the ends of the bar and the means employed to unite them. The pieces 1 and 2 are provided with curved outer faces and flat inner faces, which engage with the central piece 3. The central piece is provided with a projection or tenon 29, which enters the screw-receiving opening of the part 2 and locks the two pieces together. Between the pieces 1 and 3 is a key 30, which locks the parts against sidewise movement, and the three pieces are secured against radial separation by the screws or bolts 31. The end of the bar next the head is screw-threaded and united to a chuck 4, which is driven by the spindle in the usual manner. The outer end of the bar is supported in a bearing 5, which is mounted in an adjustable standard. The screw-threaded connection with the lathe-spindle prevents the bar from moving longitudinally. The metal piece to be machined is supported on a carriage 6, which may be made movable or stationary, as the work demands. In the present case it is stationary, clamping-bolts 7 being employed to hold it in place. These clamps can be of any suitable character so long as they will firmly hold the carriage when necessary and permit it to move when desired. The top of the carriage is provided with channels for receiving the clamp-bolts 8, which secure the work in proper relation to the tool.

The present bar being designed to feed the tool longitudinally to the right or left, as the case may be, a sliding head is provided having a central cylindrical opening that makes a working fit with the bar and is guided thereby. Extending longitudinally of the bar and located in grooves formed therein are two feed-screws 10 and 11, the former being arranged to move the carriage, while the latter moves the cutting-tool 12 and also aids in moving the head, as will appear hereinafter. The grooves for receiving the screws are both located on the same side of the parts 1 and 2, thereby permitting the screws to be brought close together, and thus reduce the total diameter of the bar to a minimum. To put the matter in a different way, the feed-screws are on the right-hand side of the parts 1 and 2 as viewed from the right-hand end. The feed-screws extend practically from one end of the bar to the other and are supported by suitable bearings. The right-hand ends of the feed-screws are provided with gears 13 and 14, having the same number of teeth, and between these gears is an idler-gear 15. The idler-gear is mounted on a stub-shaft 32 and is provided with an elongated hub, by means of which the gear can be slid endwise on its shaft when it is desired to move it out of mesh with the gears 13 and 14 for the purpose of feeding the tool without moving the head. The end of the feed-screw 11 is squared to receive a wrench or handle for rotating it for the purpose of actuating the parts.

The right-hand side of the head is slotted to receive the half-nut 16, Figs. 4 and 7, which is retained in place by a screw 17, that extends through the head parallel with the feed-screws. This nut is employed in moving the head longitudinally on the bar when it is desired to set the tool in a new position. The nut 16 is made in two pieces, so that compensation for wear of the threads can be made. The nut is divided into two parts, and any longitudinal movement of one independent of the other will take up the backlash between the threads on the feed-screw and those on the nut. I mount a short screw 17$^a$ in one half of the nut, and the projecting end thereof engages the other half of the nut. In line with the screw 17$^a$ is a similar screw 17, which is mounted in the sliding head 9, and its end engages with the opposite end of the half-nut. When it is desired to adjust the parts to compensate for wear, either the screw 17 or 17$^a$ is advanced, while the other one is turned backward until the threads in the two-part nut and those on the feed-screw are in close contact, after which the screws 17 and 17$^a$ are seated. In order to adjust the screw 17$^a$, the screw-driver is inserted through a hole in the head 9, that is in line with the screw. The small screws 17$^b$ are loosely fitted to the nut 16 and are threaded into the head 9. In adjusting the parts of the nut these screws are rotated backward a small amount, after which they are seated in place. The center of the head 9 is provided with a rectangular slot 18, which coincides with the space between the side pieces 1 and 2, and mounted in the space thus formed is a sliding tool-support 19. The ends of the tool-support are V-shaped, and engaging therewith are gibs 20, each of the latter being held in place and adjusted by two screws 21, arranged at opposite ends. As the head wears the play of the parts can be taken up by these screws. The front face of the sliding tool-support is provided with a diagonally-extending cam-groove 22, and mounted for engagement therewith is a pin 23, the latter being carried by the half-nut 24. The nut 24 is mounted so as to slide in the groove formed in the side piece 2, and mounted on the side adjacent to the tool support or carrier is a pin 23. (Shown in dotted lines, Fig. 3, and in full lines in Figs. 8 and 9.) As the nut is fed forward or back the pin 23, working in the cam-slot, will move the tool support or carrier radially toward or away from the center of revolution of the bar. When the nut is moved to the right from a central position, the support will be moved outward, and when moved to the left it will be moved inward toward the center.

The cutting-tool 12 may be of any suitable shape and is provided with a rectangular shank, which enters a corresponding socket in the tool-support. The lower end of the tool is tapped to receive the retaining-screw 25.

When it is desired to feed the head forward or back, a handle is applied to the squared end of the feed-screw 11 and the screw is rotated. Corresponding motion is then imparted to the second feed-screw through the idler-gear 15 and the gear 13, and since the pitch of the screws is similar and equal the tool is prevented from moving toward or away from the center of revolution of the bar while the head as a whole moves. In order to feed the tool independent of the head, the idler-gear 15 is moved longitudinally out of engagement with the gears 13 and 14. Motion is then imparted to the feed-screw 11, and the pin 23 will move the tool in or out, as the case may be. The rotation of the bar is relatively slow, and the feeding can be accomplished under certain conditions while the bar is in motion.

In Fig. 1 I have shown a piece of work for which the bar is particularly adapted. It comprises a main body-casting 26, having a cylindrical opening 27, through which the bar extends. This opening may be bored or machined by the bar illustrated by setting the tool at the desired distance from the center and feeding the head 9 longitudinally at the same time and maintaining the tool in a fixed position with resepect thereto. After the main opening 27 is bored it is necessary to bore or face the sides of the opening 28, and by measuring the distance between the head and a fixed part of the work—say the left-hand end, for example—the tool can be accurately set, after which it is moved radially under the action of the feed-screw 11. The importance of this arrangement will be apparent when the fact that the cutting-face of the tool is hidden from view is considered. The openings 28 differ as to their width, and the distance between one opening and the next is usually different, thus calling for considerable accuracy on the part of the workman. With a bar arranged as described all of the various openings in the piece of metal being worked may be machined without difficulty and by the ordinary lathe-hand.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a boring-bar, the combination of a support having a longitudinal recess, a pair of feed-screws extending parallel with the support, a sliding head carried by the support and having two slots, a tool that is carried by the head and is located in one of the slots, a nut situated in the other slot and engaging one of the screws for moving the head longitudinally, and a means, including a nut located in said recess in the support, which connects the other screw to the tool for feeding it.

2. In a boring-bar, the combination of a support composed of a pair of side bars, end pieces for uniting the bars in a manner to form a recess between them, a sliding head which engages with the side bars, a pair of feed-screws extending parallel with the side bars, a tool-carrier mounted on the head for transverse movement, a nut which is attached to the head and engages one of the feed-screws for moving the head longitudinally, a second nut movable on one of the side bars and in engagement with the other feed-screw, and a means on the nut for moving said carrier.

3. In a boring-bar, the combination of a longitudinally-extending support having a tool-carrier slot and a groove opening into the slot, a second groove formed in the outer surface of the support, feed-screws mounted in the grooves, a sliding head mounted on the support which is provided with a slot for the tool-carrier and a second slot for an adjusting-nut, a sliding nut mounted in the first-mentioned groove for feeding the tool-carrier radially, an adjusting-nut affixed to the head and located in the second slot for longitudinally adjusting the head with respect to the support, and a tool-carrier that is carried by the head.

4. In a boring-bar, the combination of a longitudinally-extending piece having a groove formed on one side, a second piece extending parallel with the first and provided with a groove on the same side, a feed-screw mounted in each of the grooves, a head which incloses said pieces, a tool-carrier, a nut sliding in the groove in the first-mentioned piece and engaging with the tool-carrier and a feed-screw for moving the tool radially, and a second nut affixed to the head and engaging with the other feed-screw for moving the head longitudinally.

5. In a boring-bar, the combination of a slotted support, a slotted head mounted thereon, a sliding tool-carrier having a cam-slot formed therein, a feed-screw, a sliding nut mounted in the support, and a pin mounted on the nut and arranged to enter the cam-slot.

6. In a boring-bar, the combination of a slotted support, a slotted head mounted thereon, a sliding tool-carrier which enters the slot in the support, a nut which is rigidly secured to the head, a feed-screw engaging therewith, a second nut mounted to slide in the support, a feed-screw engaging therewith, a connection between the sliding nut and the tool-carrier for feeding the tool in and out, and gearing whereby the feed-screws may be correspondingly driven to move the head and tool-carrier or disconnected for moving the tool-carrier alone.

7. In combination, a slotted support, a groove formed therein which opens into the slot, a nut mounted to slide in the groove, a feed-screw arranged to move the nut, a tool-carrier, and a cam-and-pin connection between the nut and tool-carrier.

8. In a boring-bar, the combination of a support composed of two longitudinally-extending side pieces which are separated from each other, feed-screws extending parallel therewith, a sliding head, a nut carried by the head and in working relation with one of the feed-screws, a tool-carrier mounted on the head, a nut in working relation with the tool-carrier and the other feed-screw for moving the tool in a transverse direction, end pieces which are interlocked with the side pieces, gearing supported on one of the end pieces and connected to the feed-screws, and means for securing the bars together.

9. In a boring-bar, the combination of a pair of grooved side pieces, feed-screws mounted therein, a sliding head, a tool-carrier mounted on the head for transverse movement, means for connecting the head and the tool-carrier to the screws, a pair of end pieces which are provided with projections that enter one of the grooves, and means for securing the pieces against radial separation.

10. In a boring-bar, the combination of a support, a sliding head which surrounds the support, a feed-screw, a split nut arranged to engage with the feed-screw and take up the wear of the parts, means for attaching the nut to the head, and screws for adjusting the nut in a direction parallel with the feed-screw.

11. In a boring-bar, the combination of a cylindrical slotted support, a slotted head mounted to slide thereon, a V-shaped tool-carrier, gibs between the carrier and the head, a sliding piece for moving the carrier radially, and a cam-and-pin connection between the sliding piece and the carrier.

12. In combination, a driving-spindle, a boring-bar, a chuck for uniting the spindle and bar in a manner to prevent independent longitudinal movement thereof, a bearing situated near the opposite end of the bar for supporting it, a sliding head mounted on the bar and carrying the cutting-tool, a tool-carrier transversely movable in the head, feed-screws which project beyond the end of the bar, gearing for uniting the screws which is located at the end of the bar beyond the bearing, and means for connecting the sliding head and tool-carrier to the feed-screws.

In witness whereof I have hereunto set my hand this 24th day of January, 1902.

JOHN RIDDELL.

Witnesses:
BENJAMIN B. HULL,
FRANK DOLAN.